Patented Dec. 18, 1951

2,578,672

UNITED STATES PATENT OFFICE 2,578,672

PICOLINIC ACID RECOVERY

Ben Bennett Corson and Gordon S. Black, Pittsburgh, Pa., assignors to Koppers Company, Inc., Pittsburgh, Pa., a corporation of Delaware No Drawing. Application November 23, 1945, Serial No. 630,542

17 Claims. (Cl. 202—42)

This invention relates to processes for separately recovering materials contained in an aqueous medium and is particularly directed to the recovery of pyridine carboxylic acids from aqueous solutions containing inorganic compounds.

The various methods for the recovery of material from aqueous media, such as fractional crystallization, precipitation of one material followed by filtration, evaporation followed by extraction of the residue and like processes are not suitable for the recovery of certain materials or to certain proportions of materials. With such materials or proportions, complicated procedures must be relied upon to effect the desired separation of the materials contained in the aqueous medium.

Such a problem is encountered in the manufacture of picolinic acid by the oxidation of alpha picoline and in the isolation of picolinic acid from its hydrochloride or other salt. The picolinic acid is so highly soluble in water that it is difficult to recover it free of the soluble salts which necessarily result in these processes. Various complicated processes have therefore been devised for isolating picolinic acid.

It has been proposed, for example, to isolate picolinic acid from an aqueous oxidation filtrate which is contaminated with manganese compounds by acidifying the filtrate, evaporating it to a small volume and extracting the concentrate with absolute alcohol, the alcoholic extract being subsequently dried in vacuo for several days until the syrupy mass crystallizes. An alternative process, said to be less tedious, involves separating the picolinic acid from the aqueous solution as an insoluble copper salt, and recovering free picolinic acid therefrom by decomposing the salt in aqueous suspension by hydrogen sulphide, filtering off the precipitated copper sulphide and evaporating the filtrate to dryness. (U. S. 2,009,042, 2,109,954, 2,109,957, 2,267,734, and British 447,339.) Other processes have been suggested, for example Organic Synthesis 20 79, but are nonetheless complicated and frequently as in this case still leave unsolved the problem of obtaining picolinic acid from its hydrochloride.

A similar problem is encountered in the separation of dipicolinic acid and 2,6-methyl pyridine carboxylic acids from an aqueous oxidation filtrate obtained by the oxidation of 2,6-lutidine. These two acids have been prepared by oxidizing 2,6-lutidine with aqueous potassium permanganate but the methods of separation and even of isolation of a single acid from potassium chloride were complicated. Citations: Ber. 18, 52, 1885; Ber. 19, 790, 1886; Ber. 33, 1081, 1900; and Ber. 33, 1226, 1900. The usual procedure is to form a metal salt (Cu, Pb, Ag), metal sulphide by hydrogen sulphide, filter off the metal sulphide, and finally recover the pyridine acid from the aqueous filtrate. The formation of the sulphide is slow and disagreeable and there is danger of oxidation of the metal sulphide during filtration with resultant contamination of the filtrate with soluble metal sulphate. This laborious method is applicable provided that a metal can be found which gives an insoluble salt with one acid and a soluble salt with the other acid. Silver has been widely used and this means considerable expense not to mention the explosiveness of certain silver salts and their decomposition by light. The high cost of silver makes it necessary to convert the silver sulphide back to silver salt (e. g. nitrate) for reuse, if silver were used commercially.

This invention has for its objects to provide new and improved processes for separately recovering materials contained in aqueous solutions; to provide new and improved processes by which pyridine carboxylic acids may be recovered simply and effectively from aqueous solutions containing water-soluble contaminants; to avoid the disadvantages of the prior art and to obtain advantages as will be pointed out or as will become apparent. Further objects will appear as the description proceeds.

These objects are accomplished in the present invention by distilling off water from an aqueous medium containing the materials which are to be separately recovered and simultaneously extracting the medium with a selective solvent for one of the materials. By this procedure there is effected simultaneously dehydration of the aqueous medium and an extraction of one of the materials into a selective solvent. When the dehydration is completed, the insoluble material may be filtered off and the soluble material recovered from the solvent in any suitable manner.

In carrying out the processes of the invention, the aqueous medium containing the materials to be separately recovered is subjected to distillation as required to distill over the water in the presence of a selective solvent for one of the materials. The solvent should be one which does not interfere with the the distilling over of the water. It should, therefore, have a boiling point above the boiling point of the aqueous phase which distills over. Desirably it may be so constituted as favorably to influence the removal of water or this result can be obtained by adding to the aqueous medium in addition to the solvent the material which promotes distillation of the water. There may be added to the aqueous medium, for example, a substance forming a minimum boiling azeotrope with water. This is particularly advantageous with materials which are thermally unstable at the temperatures which otherwise would be required to distill the water. By distilling the aqueous medium in the presence of such a substance in a quantity sufficient to distill over all of the water and in the presence of a selective solvent for one of the materials in a quantity sufficient to dissolve all of the soluble material, there are obtained two phases one of which is rich in one of the materials and the other of which is rich in the other material according to the degree of selectivity of the solvent. From these two phases the two materials may be recovered according to the practices usually employed in selective solvent separation.

In accordance wtih a particular embodiment of the invention, alpha picoline or its equivalent is oxidized by means of potassium permanganate or its equivalent in an alkaline aqueous solution. The reaction mixture is filtered, concentrated and then neutralized to the isoelectric point of picolinic acid, about pH 3.2, by the addition of hydrochloric acid or its equivalent. Benzene or equivalent solvent is then added to the neutralized aqueous concentrate and the mixture is subjected to distillation. This distillation effects simultaneously dehydration of the aqueous concentrate and an extraction of the picolinic acid. The water is distilled off as a benzene-water binary mixture and there remains as residue in the still a benzene solution of picolinic acid and an insoluble residue consisting largely of potassium chloride. The solution is filtered or otherwise mechanically separated from the insoluble residue and subjected to evaporation or crystallization to recover the picolinic acid. By selecting a quantity of benzene sufficient to distill off the water as the benzene-water binary mixture and still leave enough benzene to dissolve or at least to have the capacity of dissolving substantially all of the picolinic acid, a high yield of picolinic acid may be obtained.

As compared with the prior art methods the processes of the invention have the advantage of simplicity. They have the further unexpected advantage that the potassium chloride precipitated during the dehydration-extraction is finely divided. As a consequence the picolinic acid is more easily and more efficiently extracted by the solvent than is possible with the non-porous solid masses which result from evaporation as practiced in the prior art. The processes also have the advantage that the solvent is easily recovered by recycling in the process. For example, benzene being substantially insoluble in water may be separated from the benzene-water binary mixture by gravity separation and returned to the process. The solvent from the still residue is recovered in the evaporation or crystallization step for the recovery of the picolinic acid.

In place of alpha picoline in the above described process, there may be substituted other alpha substituted pyridines which on oxidation yield picolinic acid. For example, alkyl, alkenyl, aralykl, acyl, ketonyl and like groups having aliphatic carbon attached to the pyridine ring in the alpha position will yield picolinic acid on oxidation with potassium permanganate or equivalent oxidizing agents such as sodium or calcium permanganates, chromic acid, nitric acid, sulphuric acid and acid ($H_2SO_4$) hydrogen peroxide or manganese dioxide. These and like methods well known in the prior art may be utilized in preparing aqueous solutions of picolinic acid which require separation and which may be separated according to the processes of the invention. Similar solutions of picolinic acid are obtained on neutralizing a picolinic salt such as picolinic acid hydrochloride.

In place of benzene there may be substituted other solvents for picolinic acid which have a boiling point higher than the boiling point of water in the presence of the solvent. While benzene does not have a boiling point higher than water, it does have a boiling point higher than the minimum boiling azeotrope formed by the water and benzene. Benzene therefore has the advantage of permitting separation of the water at a temperature substantially below the boiling point of water. Suitable solvents which may be utilized in place of or in addition to benzene include toluene, xylene, n-butyl alcohol, chloroform, carbontetrachloride and mixtures thereof.

While benzene is the most desirable solvent from the standpoint of dehydrating the aqueous solution, it is not necessarily the best solvent for extracting material from the medium. It is of advantage, therefore, to combine with benzene or like material which promotes distillation of water a separate solvent for selectively extracting the material. With such a combination a wider range of choice of solvents suitable for selectively extracting the material is provided without sacrificing the excellent dehydrating properties of the benzene. It is of advantage with picolinic acid, for example, to utilize n-butanol or xylene both of which are unusually good solvents for picoline in combination with benzene. The n-butanol or xylene may be added to the aqueous solution in an amount sufficient to take up all of the picolinic acid and the benzene in an amount sufficient to distill off the water. Practically, the amount of benzene need not be large for it can be separated from the water by means of a suitable water trap and returned to the distillation. The picolinic acid may be recovered from its solution in the n-butanol alcohol or xylene by evaporation or crystallization. There is thus provided a highly efficacious process for the recovery of picolinic acid from aqueous solutions containing also inorganic compounds.

The invention may be more fully understood by reference to the following example in which the parts are by weight and in the cgs system unless otherwise specified:

*Example I*

Two hundred parts of alpha picoline and 3000 parts by volume of water were placed in a three-neck flask equipped with a thermometer (dipping into the liquid), a mercury-sealed stirrer, and an efficient reflux condenser. The mixture was heated on a steam bath, and 720 parts of potassium permanganate were added in eight portions over four hours, the first four additions being made at 70° C., and the last four additions at 85° C. The reaction mixture was tested from time to time, and each successive addition of permanganate was made only after the preceding addition had been consumed. After the oxidation was finished, the hot reaction mixture was filtered through a six-inch Buchner funnel and the manganese oxide was washed on the filter with 1500 parts by volume of hot water in four portions, allowing each portion to soak through the cake without application of vacuum, finally sucking the cake dry before adding the next portion of wash water.

The combined filtrate and wash water was concentrated to about 700 parts by volume whereupon 48 parts of unchanged alpha picoline came off in the aqueous distillate. To the concentrate was added 200 parts by volume of concentrated hydrochloric acid (37 per cent HCl by weight) to bring it to a pH of 3.2 (isoelectric point). The acidified concentrate was poured into a three-neck flask together with 3000 parts by volume of benzene, the flask being equipped with a mercury-sealed stirrer and a water trap surmounted by a large capacity reflux condenser. The flask was heated by hot water and the content was vigorously stirred as it boiled. The water trap separated the benzene from the water in the azeotropic distillate and returned the benzene to the flask.

After about four hours, when no more water was removed by the azeotropic distillation, the hot benzene solution was poured from the solid residue in the flask through a steam-heated funnel, and the benzene solution was evaporated in a water bath to remove the benzene, the last traces of benzene being removed at reduced pressure leaving 102 parts of picolinic acid in the flask. The solid in the extraction flask, together with the solid in the steam funnel, was ground to about 20 mesh and returned to the extraction flask where it was stirred with a fresh 3000 parts by volume portion of boiling benzene. Filtration and evaporation of this benzene extract gave 44 parts of picolinic acid. The total yield of picolinic acid from the above two extractions by benzene amounted to 146 parts which corresponded to 72.5 per cent of the theoretical amount based on the amount of alpha picoline consumed. Electrometric titration showed the picolinic acid to be 98.2 per cent pure and silver electrode titration showed that it contained 0.2 per cent of potassium chloride. If desired, picolinic acid can be recrystallized from benzene.

The potassium chloride residue still contained about 25 parts of picolinic acid which corresponded to an additional 12.5 per cent yield, and the greater part of this can be recovered, if desired, by crystallization of several combined potassium chloride residues from water, followed by dehydration-extraction of the aqueous mother liquor with benzene, or the picolinic acid-contaminated potassium chloride residue can be finely ground and re-extracted with benzene; thus, the total yield of picolinic acid lies between 72.5 per cent and 85 per cent, depending upon the thoroughness with which the last 12.5 per cent of the picolinic acid yield is recovered from the potassium chloride.

In accordance with another embodiment of the invention 2,6-lutidine is oxidized by means of potassium permanganate or its equivalent in an alkaline aqueous solution. The oxidation filtrate after removal of unreacted lutidine by distillation is made strongly acid by the action of a strong acid such as hydrochloric acid. A rather high acidity, for example 1.5 normality, is beneficial since at lower acidities the dipicolinic acid is contaminated by potassium salt. The acidity should not be high enough to dissolve the dipicolinic acid which is weakly basic relative to 2,6-methyl pyridine carboxylic acid. Dipicolinic acid is recovered from this solution by a suitable crystallizing procedure and the final filtrate is treated in the manner described above for alpha picolinic acid to recover the 2,6-methyl pyridine carboxylic acid. The following example is illustrative:

*Example II*

A suitable reactor provided with a reflux condenser is charged with 107 parts of 2,6-lutidine and 2500 volume parts of water. The mixture was heated on a steam bath and 335 parts of potassium permanganate (2.12 mols per mol of 2,6-lutidine) was added in five portions, each addition being made only after the preceding addition had completely reacted. The temperature was maintained between 70° and 95° C., and the oxidation required three hours. The oxidation mixture was filtered by suction and the manganese oxide was washed on the filter with one liter of hot water. The filtrate and wash water were combined and distilled to remove unreacted lutidine ($\pm$) 20 parts. The topped residue was acidified to 1.5 normality with concentrated hydrochloric acid and cooled to crystallize dipicolinic acid which was removed by suction filtration. The mother liquor was concentrated to 500 volume parts and cooled to remove additional dipicolinic acid, now contaminated with some potassium chloride. The mother liquor was set at pH 3.3 (isoelectric point) by the addition of potassium hydroxide, thus forming more potassium chloride which was filtered off. The filtrate was dehydrated, as in Example I, with 2000 volume parts of benzene. When no more water was removed, the hot benzene solution was filtered. Evaporation of the benzene yielded 65 parts of 2,6-methyl pyridine carboxylic acid which corresponded to 60 per cent of the theoretical amount based on the amount of lutidine consumed. The yield of dipicolinic acid was 20 parts (15 per cent of the theoretical amount), thus bringing the total yield of acids to 75 per cent of the theoretical amount.

An alternative procedure is to concentrate the oxidation filtrate to 500 volume parts, set it at pH 3.3 and dehydrate and extract whereby the mono acid dissolves in the benzene and the dipicolinic acid is in the dry, solid residue along with potassium chloride. The solid residue is dissolved in the appropriate amount of hot water, the solution is set at 1.5 normality, and the dipicolinic acid is removed from solution by cooling.

In place of benzene there may be substituted other solvents for 2,6-methyl pyridine carboxylic acid which have a boiling point higher than the boiling point of water in the presence of the solvent. Similarly mixtures of solvents as described above for picolinic acid may be employed. Those solvents and mixtures which are useful for picolinic acid may, in general, be utilized for 2,6-methyl pyridine carboxylic acid.

While the invention has been described with reference to the separation and recovery of picolinic acid from its aqueous solutions, it will be understood that in its broader aspects it may be employed for the separation and recovery of other water-soluble organic substances from their aqueous solutions.

We claim:

1. In a process for recovering water-soluble pyridine carboxylic acid from an aqueous solution containing water-soluble inorganic contaminants, the steps of setting said solution at the isoelectric point, distilling off the water, simultaneously extracting said solution with a solvent for pyridine carboxylic acid which is substantially nonsolvent for said inorganic contaminants and has a boiling point above that at which water is distilled, separating the solution thus obtained from the inorganic contaminants, and recovering pyridine carboxylic acid from the solvent.

2. The process of claim 1 in which said solvent is an organic liquid and, therefore, inherently has relatively little solubility for said inorganic contaminants.

3. The process of claim 2 in which said solvent is an aromatic hydrocarbon.

4. The process of claim 3 in which said solvent is benzene.

5. In a process for recovering water-soluble pyridine carboxylic acid from an aqueous solution containing water-soluble inorganic contaminants, the steps of setting said solution at the isoelectric point, distilling water from said solution in the presence of a material which forms a minimum boiling azeotrope with water and thereby promotes distillation of water from said solution and in the presence of a solvent for pyridine carboxylic acid which has relatively little solubility for said inorganic contaminants and has a boiling point above that at which water is distilled until substantially all of the water is distilled over, separating the solution remaining as still residue from the undissolved material and recovering pyridine carboxylic acid from the thus separated solution.

6. The process of claim 5 in which said solvent is an organic liquid and, therefore, inherently has relatively little solubility for said inorganic compounds.

7. The process of claim 6 in which said material is an aromatic hydrocarbon.

8. The process of claim 7 in which said material is benzene.

9. The process of claim 8 in which said solvent is benzene.

10. The process of claim 8 in which the pyridine carboxylic acid is picolinic acid.

11. The process of claim 10 in which the solvent is benzene.

12. The process of claim 10 in which the solvent is xylene.

13. The process of claim 10 in which the solvent is n-butanol.

14. In a process for recovering 2,6-methyl pyridine carboxylic acid and dipicolinic acid from aqueous oxidation filtrate of the oxidation of 2,6-lutidine, the steps of acidifying said filtrate with a strong acid to an acidity equivalent to about 1.5 normality, crystallizing out dipicolinic acid, separating off the crystallized dipicolinic acid, recovering 2,6-methyl pyridine carboxylic acid from the remaining solution by distilling off water from said solution in the presence of an inert organic liquid vehicle so constituted as to act as a solvent for 2,6-methyl pyridine carboxylic acid and as an entrainer in the azeotropic distillation of water, separating the solution of 2,6-methyl pyridine carboxylic acid in said organic liquid vehicle from undissolved material, and separately recovering 2,6-methyl pyridine carboxylic acid and said organic liquid vehicle.

15. The process of claim 14 in which said inert organic liquid vehicle is benzene.

16. In a process for recovering 2,6-methyl pyridine carboxylic acid and dipicolinic acid from the aqueous oxidation filtrate of the oxidation of 2,6-lutidine, the steps of separating and recovering dipicolinic acid from said filtrate, setting the remaining solution at the isoelectric point, distilling water therefrom in the presence of an organic liquid containing benzene and a solvent for picolinic acid having a boiling point above that at which water is distilled from said solution in the presence of benzene in an amount sufficient to distill over substantially all of the water, and sufficient to dissolve all of the 2,6-methyl pyridine carboxylic acid, separating the resulting solution of 2,6-methyl pyridine carboxylic acid in said organic liquid vehicle from undissolved material, and separately recovering 2,6-methyl pyridine carboxylic acid and said liquid organic vehicle.

17. The process of claim 16 in which said solvent is benzene.

BEN BENNETT CORSON.
GORDON S. BLACK.

REFERENCES CITED

The following references are of record in the file of this patent:

UNITED STATES PATENTS

| Number | Name | Date |
| --- | --- | --- |
| 2,288,281 | Heuser | June 30, 1942 |
| 2,347,410 | Hawkinson | Apr. 25, 1944 |
| 2,405,223 | Manning | Aug. 6, 1946 |
| 2,436,660 | Mueller | Feb. 24, 1948 |
| 2,449,906 | Mueller | Sept. 21, 1948 |
| 2,476,004 | Teeters | July 12, 1949 |
| 2,517,276 | Bassford et al. | Aug. 1, 1950 |